May 2, 1933. C. W. McCOY 1,906,704
LIQUID CIRCULATING SYSTEM
Filed Aug. 28, 1931 2 Sheets-Sheet 1
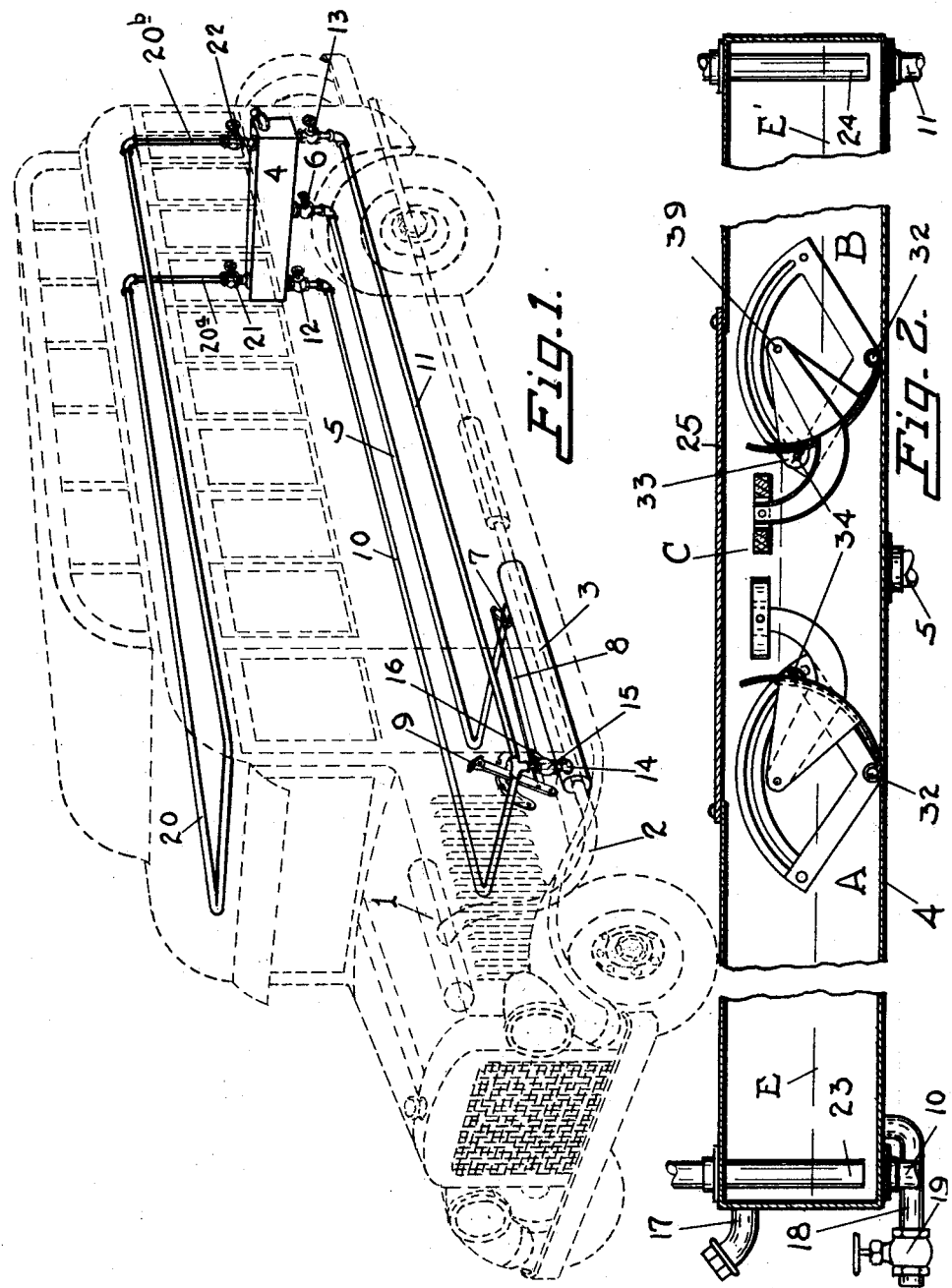
CHARLES W. McCOY, Inventor
By *Herbert E. Smith*
Attorney May 2, 1933.  C. W. McCOY  1,906,704
LIQUID CIRCULATING SYSTEM
Filed Aug. 28, 1931  2 Sheets-Sheet 2
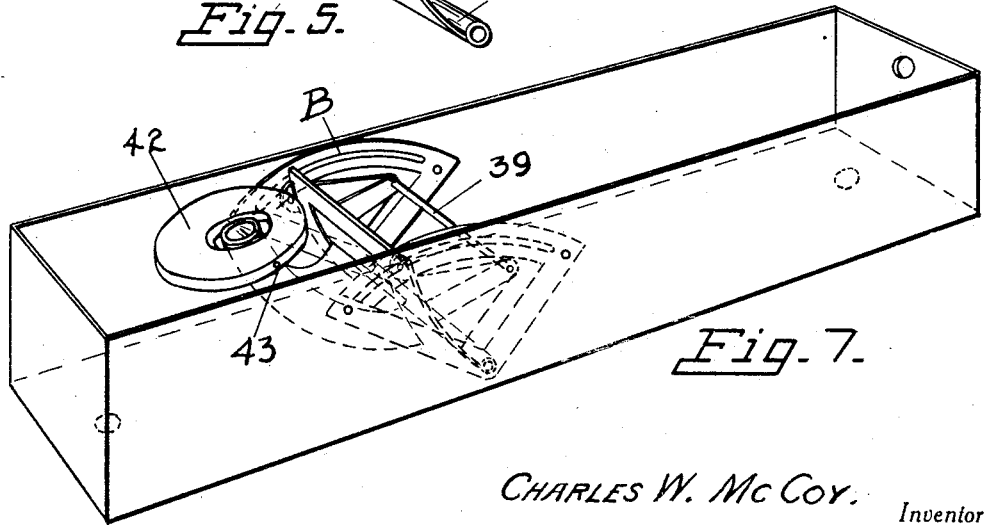
CHARLES W. McCOY, *Inventor*
By *Herbert R. Smith*
  *Attorney*

Patented May 2, 1933

1,906,704

UNITED STATES PATENT OFFICE

CHARLES W. McCOY, OF SPOKANE, WASHINGTON

LIQUID CIRCULATING SYSTEM

Application filed August 28, 1931. Serial No. 559,920.

My present invention relates to an improved liquid circulating system designed particularly for use in conditioning the air in motor busses and other land vehicles, railroad cars, water craft, and similar vehicles and craft that are subject to lateral sways or side tilts while traveling. In the accompanying drawings I have illustrated a motor bus, and hereinafter I have described the installation of the circulating system as adapted for the bus which derives its power from an internal combustion engine or motor, as an exemplification of the principles of my invention.

In its adaptation to the motor bus the circulating system is used in combination with a heater receiving heat from exhaust gas of the engine, and the liquid or hot water is circulated through a loop or circuit from which the heat is distributed or radiated for warming the interior of the bus. The bus is also equipped with a second loop or circuit for cooling its interior by means of a refrigerant, as iced brine, and the brine is circulated by means of the devices of my invention. Thus the liquid circulating system may readily be converted for warming the interior of the bus during cold weather, and for cooling the interior of the bus during warm or hot weather, and means are provided for rendering inactive the warming system while the cooling system is being employed, and for rendering inactive the cooling system while the heating system is active or being operated. In both cases, the circulation of the hot water, or of the cold brine, is accomplished responsive to the lateral sway or side tilt of the bus while it is traveling, and for this purpose I employ a tank having at least two compartments in which are maintained at all times two different liquid levels, and the tendency of the liquid to seek a normal level is utilized to cause a gravity circulation of the liquid throughout the conditioning system. Means are provided in the tank, operative responsive to the lateral sway or side tilt of the bus and tank, for maintaining the two liquid levels in the tank.

The invention consists in certain novel combinations and arrangements of parts as will hereinafter be more fully set forth and claimed. In the accompanying drawings I have illustrated one complete example of the physical embodiment of my invention in which the parts are combined and arranged according to one mode I have thus far devised for the practical application of the principles of my invention.

Figure 1 is a perspective view showing by dotted lines a well known type of motor bus, equipped with an internal combustion engine or motor, and having the convertible heating and cooling systems of my invention installed therein for use.

Figure 2 is a longitudinal, vertical, sectional view of the supply tank, disclosing a duplex arrangement of the water-transfer nozzles in the tank for maintaining the two different water-levels.

Figure 3 is a top plan view of the tank, partly broken away to disclose the interior arrangement.

Figure 4 is a perspective view of the liquid-transfer nozzle.

Figure 5 is a perspective view of the adjustable dam or separator plate. Figure 6 is a perspective view showing the guide brackets for the adjustable dam. Figure 7 is a perspective view of a tank with a single transfer nozzle therein.

In Figure 1 where the general assembly and arrangement of parts are shown in connection with a standard type of motor bus equipped with an internal combustion engine, the manifold for exhaust gas from the engine is indicated at 1, and the exhaust pipe is designated 2. In the installation of the heating system for the bus I utilize a heater 3 that surrounds a portion of the exhaust gas pipe, and this heater, in the form of a cylinder receives the water to be heated from an elevated supply tank 4 through the feed pipe 5.

The supply tank, as shown is arranged transversely of the bus and is rigidly secured to its chassis or main frame, in order that the tank may tilt or sway laterally with the bus, as the vehicle is traveling, and the tank is elevated at a higher level than the heater 3 in order that the water may flow by gravity from the tank to the heater through pipe 5.

A control valve 6 is provided in the feed pipe 5, and the latter, as shown, is attached at the bottom of the tank and centrally thereof, while the heater end of the feed pipe is provided with a cut-off valve 7.

The cut-off valve is operated through the use of a pivoted link 8 that extends forwardly of the bus and is pivoted to a pedal or foot lever 9 which is located in position readily accessible to the driver of the bus for opening and closing the valve when necessary or desirable.

Two hot-water pipes 10 and 11 forming part of the hot water loop or circuit are connected to the bottom of the tank near its opposite ends and these pipes, adjacent the tank, are provided with control valves 12 and 13, and the loop is connected to the heater 3 by the short, vertical pipe 14. A cut-off valve 15 is provided in this short hot-water pipe, and its stem is pivotally connected at 16 to the link 8, thereby connecting or coupling the two cut-off valves 7 and 15 so that they are simultaneously controlled by operation of the pedal 9.

As shown in Figure 1 the hot-water pipes 10 and 11 are disposed parallel, at opposite sides of the bus, and in a horizontal plane between the lower heater and the upper tank, and these pipes, which are located just above the floor of the bus, may be provided with radiators if desired to increase the heating surface from the hot water as it is circulated between the tank and the heater.

The tank may be filled through the inlet or filling pipe 17, and for draining the tank when required a drain pipe 18 is connected to the bottom of the tank and provided with a drain valve 19. The circulation of the water follows the feed pipe 5, through which the water flows by gravity from the tank to the heater, and the heated water rises from the heater at the end opposite to its ingress and flows back through the two pipes 10 and 11 to the tank. The water thus flows from the central part of the tank to the near end of the heater, and returns from the far end of the heater 3 through pipes 10 and 11 to the opposite ends of the tank.

The brine loop 20 for cooling the interior of the bus is located in the upper part of the bus, just below its clerestory, in order that the cooled air may descend toward the floor of the bus, and thus distribute the cooled air throughout the interior of the bus. The rear ends of the loop 20 are connected by upright branches 20a and 20b to the top of the tank, near its opposite ends, and the overhead loop is provided with cut-off valves 21 and 22 adjacent the tank, which are manually controlled for cutting out the overhead loop when the heater is used for heating purposes. When the hot water pipes are employed, of course all of the hot water valves are opened and the cut-off valves 21, 22 are closed; and when the brine loop is employed to cool the bus the valves 21 and 22 are opened, but valves 6, 12 and 13 are closed, as are also the valves 7 and 15.

The brine, which may be cooled before it is put in the tank, or which may be cooled by the adition of ice to the tank, flows upwardly from one end of the tank, as through pipe 20a, and returns to the opposite end of the tank, as down through pipe 20b. The tank is provided with two brine compartments, one with a high level or surface line at the left in Figure 1, and also in Figure 7, and the other at a lower level or lower surface line as at the right in Figures 1 and 7. That is, the outlet compartment has a higher head of brine than the inlet compartment, and this condition is maintained at all times while the cooling system is being used, the ends 23 and 24 of the brine loop being located below the brine lines.

In the hot water heating system, as disclosed, the tank has a central outlet compartment C with a high water head or water line, and two end compartments E and E' with a lower water line or head than in the outlet compartment.

The higher head of water for the outlet compartment is maintained through the instrumentality of one or more automatically operating devices that are responsive to the tilting or swaying motion of the traveling bus, and which are instrumental in causing the water, or brine, to flow from an inlet compartment to the outlet compartment.

In Figure 2 a duplex arrangement of these devices is shown at A and B, while in Figure 7 a single device B is illustrated for circulating the brine as described.

The devices A and B are of similar construction, but arranged to operate or cause flow of water in opposite directions, and the description of parts of one device will suffice for both devices.

A lid 25 is provided in the top of the tank to close an opening through which access may be had to the interior of the tank for installing and adjusting these devices A and B, and the movable parts of the devices are supported by means of arcuate brackets 26 and 27 that are attached to the inner sides of the front and rear walls of the tank. The brackets are stationary, and are fashioned with arcuate slots 28, 28 complementary one to the other, for the support of a transversely disposed, curved, wall or partition 29, in the nature of a dam or concavo-convex barrier plate having an opening 30 therein. At its lower edge the curved plate is provided with a pivot sleeve 31, and by means of a pivot rod or bar 32 the barrier plate is pivoted between the two brackets at or near the bottom of the tank. The barrier plates of the devices A and B, both extend transversely of the tank and they form the three compartments C, E, and E′ in the tank. The barrier plates are of sufficient height to entirely close communication between adjoining compartments, if desired, and they may be swung on their pivots 32 to perpendicular position or to angular positions of less than 90 degrees, as indicated in Figure 2, and by means of perforated ears 33 on the plate, and clamp bolts 34 engaging the slotted brackets, the plate may be secured in angular adjusted position.

Sufficient space is indicated above the barrier plates to permit water to splash, flow, or wash over the plates from one of the outer, intake compartments E or E′ to the intermediate, outlet compartment C. Thus, if the bus sways, tilts or leans sidewise sufficiently to lift the E end of the tank or lower the E′ end, water in compartment E will splash or flow over the top of the concavo-convex wall into compartment C. Inasmuch as the bus is swaying intermittently from side to side as it travels, it will be apparent that this movement occurs with sufficient frequency to maintain a higher head or water level in the outlet compartment than in the inlet compartments, consequently the water flows by gravity from the tank to the heater, and is returned to the tank because of the higher head in the central or outlet compartment.

The above results are accomplished in response to maximum swaying and tilting of the bus, in its travels, and the two barrier plates or walls may be adjusted to vary the space or wier over the dams or walls, in accordance with the condition of the road over which the bus travels. If the road is particularly rough or uneven, some of the water may splash from the central outlet compartment over a dam into an inlet compartment, but the transverse walls may be adjusted to compensate for this condition in order that the higher head or level may be maintained in the outlet compartment.

To insure a transfer of water from the inlet compartments to the outlet compartment, even on the smoothest roads, means are provided, responsive to the lateral sway or tilt, as when the bus is making a turn, for feeding the water to the outlet compartment to maintain its higher head or water level. Each of the barrier plates is provided with angular arms 35 having perforated ends 36, and a gate or closure 37 having complementary arms 38 is pivoted at 39 to these arms 35. The gate has a curvature to conform to the shape of the barrier plate and its dimensions are greater than the opening 30 of the plate, in order that the gate, regardless of its position, will always close the opening. An oscillatable, float-supported, funnel shaped, nozzle 40, is secured to the gate 37 with its larger opening at the inlet side of the tank and its smaller outlet opening 41 at the outlet portion of the tank. The funnel is of curved shape as indicated, and at its discharge end 41 this funnel or nozzle is provided with a float 42 connected by a gimbel or pivot joint 43 with the nozzle. The float is shown as of elliptical shape with a central opening to accommodate the discharge end of the nozzle or funnel, and this float is designed to support the nozzle with its discharge end above the water level in the outlet chamber, at all times. The pivot 39 and the float 42 support or suspend the nozzle in correct position to compensate for the movement of the tank and the barrier wall responsive to the swaying or tilting movement of the tank and its walls 29. Thus, it will be apparent that as the tank sways or tilts with a uniform, intermittent, movement, water will flow from the higher end of the tank through the nozzle, and be discharged into the outlet compartment at the lower side of the barrier plate.

Although the moving parts and the stationary parts of the device do not have water-tight joints, it will be evident that the joints do not provide sufficient openings to materially effect the two maintained liquid levels in the outlet compartment and the inlet compartment or compartments.

These float supported, oscillatable transfer nozzles, or one of them, are also used in the transfer of brine from an inlet compartment to an outlet compartment, when the cooling system is being employed.

Various changes and alterations may be made and are contemplated in adapting the circulating systems to different types of vehicles, cars, or craft, and these may be made within the scope of my claims without departing from the principles of my invention.

Having thus fully described my invention, what I claim as new and desire to secure by Letters Patent is:—

1. In a liquid circulating system for use with a traveling vehicle, the combination with a transversely disposed tank having a transverse wall forming an inlet compartment and an outlet compartment, means for varying the distance of the top edge of said wall from the bottom of the tank, and a circulating loop connected to said compartments, of means responsive to swaying movement of the vehicle for maintaining a higher liquid level in the outlet chamber than the level in the inlet chamber.

2. In a liquid circulating system for use with a traveling vehicle, the combination with a tank having a partition forming an inlet chamber and an outlet chamber, and a liquid circulating loop connected to said chambers, of a float-supported transfer nozzle suspended in an opening of the partition and responsive to movements of the vehicle for maintaining a higher head of liquid in the outlet chamber than in the inlet chamber.

3. The combination with a tank having an interior partition with an opening, of a pivoted gate closing said opening, a transfer nozzle carried by the gate and opening to the tank at opposite sides of the partition, and a supporting float for the free end of the nozzle.

4. In a liquid circulating system, the combination with a tank having an open-center partition, of a pivoted gate closing the opening in the partition, a transfer nozzle carried by the gate and projecting through said opening, said nozzle opening to the tank at opposite sides of the partition, and a supporting float pivoted on the free end of the nozzle.

5. In a liquid circulating system, the combination with a tank having a pair of arcuate, slotted, spaced brackets, of a concavo-convex barrier plate pivoted at its lower end in said brackets, means for clamping the free end of the plate to said slotted brackets, said plate having an opening therethrough, side arms on the plate, a gate for closing said opening and complementary side arms on said gate pivoted to the first side arms, a transfer nozzle rigid with the gate, and a pivoted float at the free discharge end of said nozzle.

In testimony whereof I affix my signature.

CHARLES W. McCOY.